(12) United States Patent
Wilner (10) Patent No.: US 8,096,188 B2
(45) Date of Patent: Jan. 17, 2012

(54) HIGHLY SENSITIVE PIEZORESISTIVE ELEMENT

(75) Inventor: Leslie Bruce Wilner, Palo Alto, CA (US)

(73) Assignee: Meggitt (San Juan Capistrano), Inc., San Juan Capistrano, CA (US)

( * ) Notice: Subject to any disclaimer, the term of this patent is extended or adjusted under 35 U.S.C. 154(b) by 0 days.

(21) Appl. No.: 12/568,300

(22) Filed: Sep. 28, 2009

(65) Prior Publication Data

US 2010/0139402 A1  Jun. 10, 2010

Related U.S. Application Data

(63) Continuation of application No. 11/538,909, filed on Oct. 5, 2006, now Pat. No. 7,594,440.

(51) Int. Cl.
*G01L 9/06* (2006.01)
*G01P 15/12* (2006.01)

(52) U.S. Cl. ........... 73/721; 73/754; 73/514.33; 257/419

(58) Field of Classification Search ............... 73/514.33, 73/754, 721; 257/417, 419
See application file for complete search history.

(56) References Cited

U.S. PATENT DOCUMENTS

| | | |
|---|---|---|
| 4,047,144 A | 9/1977 | Wong |
| 4,498,229 A | 2/1985 | Wilner ........................ 29/580 |
| 4,689,600 A | 8/1987 | Wilner |
| 4,737,473 A | 4/1988 | Wilner ........................ 437/154 |
| 5,172,205 A | 12/1992 | French et al. |
| 5,408,112 A | 4/1995 | Tai et al. |
| 5,412,986 A | 5/1995 | Beringhause et al. |
| 5,425,841 A | 6/1995 | Kurtz et al. |
| 6,931,928 B2 | 8/2005 | Hashimoto et al. |
| 7,104,130 B2 | 9/2006 | Kenny et al. |
| 2006/0130596 A1 | 6/2006 | Wilner |
| 2007/0193353 A1 | 8/2007 | Kim et al. |

OTHER PUBLICATIONS

Suminto, J.T., "A wide frequency range, rugged silicon micro accelerometer with overrange stops," Micro Electro Mechanical Systems, 1996, MEMS '96, Proceedings. 'An Investigation of Micro Structures, Sensors, Actuators, Machines and Systems'. IEEE, The Ninth Annual International Workshop on, pp. 180-185, Feb. 11-15, 1996.
Holbert, K.E.; Nessel, J.A.; McCready, S.S.; Heger, A.S.; Harlow, T.H., "Response of piezoresistie MEMS accelerometers and pressure transducers to high gamma dose," Nuclear Science, IEEE Transactions on, vol. 50, No. 6, pp. 1852-1859, Dec. 2003.

*Primary Examiner* — Lisa Caputo
*Assistant Examiner* — Punam Roy
(74) *Attorney, Agent, or Firm* — Paul Davis; Goodwin Procter LLP (57) ABSTRACT

A mechanical-to-electrical sensing structure is provided with first and second movable blocks. A first hinge is coupled to the first and second movable blocks and configured to resist loads other than flexing of the first hinge. At least a first gage link is separated from the first hinge and aligned to provide that a moment tending to rotate one of the first or second blocks relative to the other about the first hinge applies a tensile or compressive force along a length of the first gage link. Electrochemistry is used to define the at least first gage.

29 Claims, 6 Drawing Sheets

HIGHLY SENSITIVE PIEZORESISTIVE ELEMENT

CROSS-REFERENCE TO RELATED APPLICATIONS

This application is a continuation of U.S. Ser. No. 11/538,909, filed Oct. 5, 2006, now U.S. Pat. No. 7,594,440, which application is fully incorporated herein by reference.

BACKGROUND

1. Field of the Invention

This invention relates generally to mechanical-to-electrical sensing structures, and more particularly to mechanical-to-electrical sensing structures that use electrochemistry to define gage links with P-type piezoresistor elements.

2. Description of the Related Art

In electromechanical transducers a transducing element is utilized for detecting the relative displacement of two parts and for developing a corresponding electric signal. Generally, such relative displacements have been measured in the past with various kinds of strain gages. However, these have a tendency to be of considerable weight, some of which are very bulky, some of which are not very sensitive. Those that are have intricate designs which are very expensive.

Force-type sensors or gages are known which are mounted between two parts between which a force is applied. The gage is, therefore, strained in an amount which depends upon that force.

As piezoresistive transducers have developed in use over the years, it has become increasingly desirable to have extremely small sensors of high sensitivity and low bulk. However, in order to develop force gages which are of extremely small size, difficulties arise in the handling thereof for subsequent mounting upon their substrate, once they are developed. They are difficult to handle not only because of their small size, but also because of their fragility.

One of the primary advantages of force transducers lies in the fact that the displacement between the pads at each end thereof produced by relative motion of the two parts to which the pads are attached is concentrated in the "suspended", so to speak, portion of the force gage which can mechanically amplify the strain being sensed or measured. Furthermore, the resistance change of the element per unit displacement is greatest as the length of the element is reduced. By use of both short gage lengths and appropriate leverage very large resistance changes may result from very small displacements. This change in resistance is determined by means of electrical current flowing through the element from one pad to the other, and measuring changes in voltage or other electrical properties resulting from changes in resistance. However, when attempts are made to reduce to a smaller size such force gages, then, as mentioned above, difficulties arise relative to the handling thereof in mounting upon their substrates, as well as other problems which ordinarily arise in handling very small objects.

Strain sensitive elements are provided in the form of force gages which are derived from the substrate upon which they are subsequently supported in use. That is, the gages are defined upon the substrate or marked thereon, and subsequently etched right from the material of the substrate. In one form of force gage, the gage is etched to allow a small support or mesa underneath, while maintaining the gage still connected by this minute portion of the substrate to the substrate proper. In its preferred form, the invention is directed to a force gage which is etched free of its substrate along its length but continuous with it at its ends. Thus, the gages of the invention are crystallinally continuous with their support.

That is, force gages of substantially smaller strain volume are produced by defining the gage in the substrate or in material rigidly bonded to the substrate, and subsequently etching away the immediately adjacent material, leaving the gage free in space, after the fashion of force gages of the past, but supported against unwanted cross loads by remote portions of the substrate. Such gages may have volume as small as $3 \times 10^{-10}$ cubic centimeters of stressed material, as opposed to present commercially available force gages wherein the strained volume is $5. \times 10^{-7}$ cubic centimeters. Both gages would typically be strained to one part per thousand. The strain energy is thus a thousand fold less for the smaller gage.

Gages on this type typically have dimensions of about 0.6E-4 cm×4E-4 cm×12E-4 cm, 3E-11 cubic cm, 50 ohms. In one force gage, a conventional silicon crystal material is selected, and the outline of the gage is etched on the selected crystal which forms the substrate. An etch is selected which is both anisotropic and doping-selective. Caustic, hydrazine, and pyrocatechol etchants may be selected, depending upon the results desired. They attack silicon rapidly in the [112] direction, moderately rapidly in the [110] direction, and very slowly in the [111] direction. With this invention, the substrate orientation is (110) plane and [111] along the gage so as to define a groove over which the gage extends. With such orientation, a groove is produced with walls which are nearly vertical, and with floors that are nearly flat.

The same etchants which are anisotropic are dopant selective, in that they attack very slowly silicon in which a boron concentration is developed which is greater than $5 \times 10^{19/cc}$. In accordance with the process of the invention, the gage is defined and its terminals are also defined by a planar diffusion or ion implantation through an oxide mask to a boron concentration of roughly $10 \times^{20/cc}$. The boron makes the gage P-type, while the substrate is N-type. The diffused area is electrically isolated from the substrate by a P-N junction. During the etching procedure which forms the groove, the gage is exposed to the etchant, but is resistant to it. As will be appreciated, and explained further herein, when the groove is defined over which the gage extends, a hinge is also defined in the substrate around which one end of the substrate moves relative to the other to develop the strain being monitored by the sensor. Also, the hinge protects the gage against transverse loads. Not all of the anisotropic etchants are also doping selective.

It is noted that the gage material spared by the dopant-selective etch is necessarily highly doped and therefore of low resistively, typically 0.001 ohm-cm. This makes the individual gages have resistance which is inconveniently low for conventional circuitry. For example, a "sturdy" gage would have resistance only 13 ohms, and a smallest old-art gage 50 ohms. Free-standing transducers for the general market are expected to have resistance well over 100 ohms and 1000 ohms is desired. It is necessary, therefore, to set several of these gages electrically in series, mechanically in parallel, to achieved an acceptable resistance. Each added gage needs the same strain energy from the mechanical signal source, so the system sensitivity declines in order to bring its resistance up. In another force gage, two substrate wafers are bonded together. Grooves are formed either before or after bonding of the wafers, gages and their terminals are defined in the gage wafer by doping them to the requisite high concentration of boron before bonding the wafers, then etching away all of the undoped portion of the gage wafer. Alternatively, the whole bonded surface of the gate wafer is doped with boron so that the etching leaves a continuous sheet of gage material from which gages may be etched by a subsequent photolithographic step.

Once the two wafers are bonded together, with the gages positioned over their appropriate grooves or apertures which have been defined in the wafers, then the gages are freed by etching away all of the gage wafer except the gages and their terminals.

SUMMARY

An object of the present invention is to provide improved piezoresistive devices, and their methods of manufacture.

Another object of the present invention is to provide piezoresistive devices with improved sensitivities, and their methods of manufacture.

A further object of the present invention is to provide piezoresistive devices, and their methods of manufacture that have self protecting edges.

Yet another object of the present invention is to provide piezoresistive devices, and their methods of manufacture, that use electrochemistry to define gage links, rather than doping-selective etchants, permitting high resistance in individual finks and avoids the use of multiple links merely to provide an adequate resistance.

These and other objects of the present invention are achieved in a mechanical-to-electrical sensing structure with first and second movable blocks. A first hinge is coupled to the first and second movable blocks and configured to resist loads other than flexing of the first hinge. At least a first gage link is separated from the first hinge and aligned to provide that a moment tending to rotate one of the first or second blocks relative to the other about the first hinge applies a tensile or compressive force along a length of the first gage link. Electrochemistry is used to define the at least first gage.

DETAILED DESCRIPTION

The present invention provides piezoresistive devices, and their methods of manufacture, that use electrochemistry to define gage links, rather than doping-selective etchants. The use of electrochemistry provides high resistance in individual links and avoids the use of multiple links merely to provide an adequate resistance.

The material of the substrate of the present invention is silicon oriented P-type that is consumed by an electrochemical etchant while a biased N-type is defended. Gage links 20 are oriented (110), so that the [111] direction, the direction of greatest gage factor for P-type silicon, is available on the surface. The (111) planes, orthogonal to the [111] direction, etch slowly in the electrochemical etchant and produce nearly vertical walls below the revealed gage links 20.

With the present invention, N-type material, that forms one or more gage links 20, is diffused into P-type bulk and defended by electrical bias from etchant that cuts a trench under it. The p-type electrical links extend the length of the gage links 20, the piezoresistors, and are implanted before this etching. They are then covered on the surface with oxide while etching.

In the present invention, the actual P-type piezoresistor, or gage link 20, is embedded in a mechanical link of N-type material. The dimensions of the gage link 20 can be enlarged to allow for errors in alignment and dimensional control. As a non-limiting example, a minimal gage link 20 is about 1E-4 cm in thickness, 6E-4 cm in width, and 14E-4 cm in length, for a strained volume of 8.4E-11 cubic cm. The resistance of the P-type gage embedded in this link is controlled by the p-type doping. By way of illustration, and without limitation, the p-type doping can be 1000 to 3000 ohms. In one embodiment, strain in the gage link does not exceed about 0.0002.

In one embodiment, an entire sheet of N-type, provided as an epitaxial layer or diffused, is not all thought out. The outlines of the gage links 20 are cut through the thickness of this sheet before proceeding to the electrochemical etch. A pathway that is un-examined starts with two wafers, one with an N-type layer on one surface, bonding them, and etching away the carrier of the N-type layer. If the bonding is done using oxide bonding materials, this gets back to SOI, but with more options. If the bonding is silicon to silicon, direct wafer bonding, the process looks more like the epi pathway, though again with more options.

Figure 1:
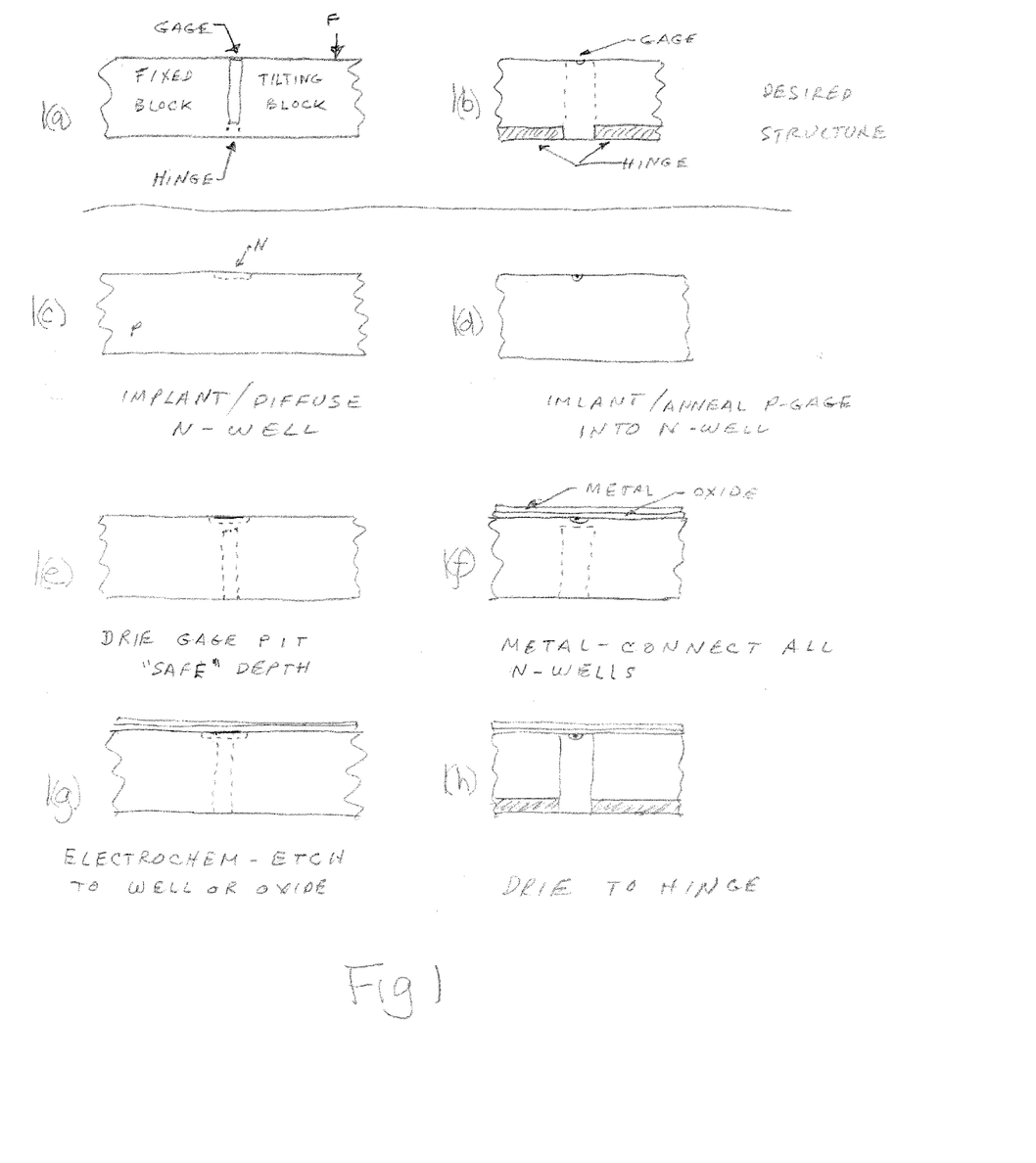
FIGS. 1(a) through 1(h) illustrate an embodiment of the present invention where electrochemistry is used to define gages.

FIG. 1(a)-1(b) illustrate an embodiment of the present invention with a gage, hinge, fixed black and a tilting block.

FIGS. 1(c)-1(h) illustrate an initial implant/diffuse to create an N-well, implant/anneal a P-gage into the N-well, DRIE gage pit to a safe depth, metal connect all N-wells, electrochemically etch to well or oxide and finally DRIE to the hinge.

Figure 2A:
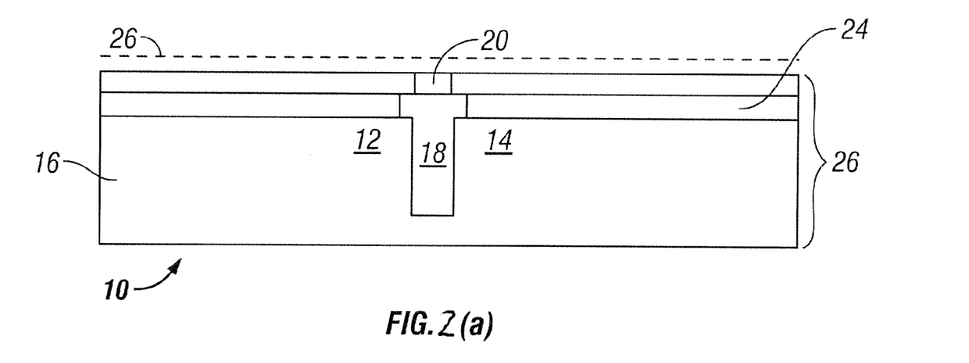
FIG. 2(a) is a perspective view of one embodiment of a mechanical-to-electrical sensing structure, such as a gage link, of the present invention.
Figure 2B:
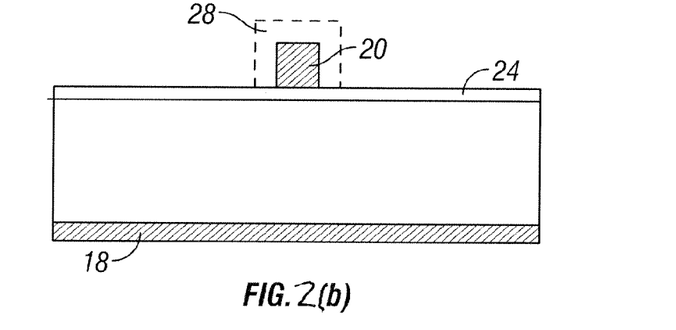
FIG. 2(b) is a cross-sectional view of the FIG. 2(a) mechanical-to-electrical sensing structure.

In one embodiment of the present invention, as illustrated in FIGS. 2(a) and 2(b), a mechanical-to-electrical sensing structure 10 is provided that has first and second movable blocks 12 and 14 formed. A first hinge 18 is coupled to the first and second movable blocks 12 and 14 and is configured to resist loads other than flexing of the first hinge 18. The first hinge 18 is formed. A first piezoresistive element, or gage link 20 is formed using electrochemistry to define gage links.

In one embodiment, the first gage link 20 is proportioned to substantially resist buckling to a compressive load. Substantially resist buckling means that the buckling of the gage link 20 should not be the limit to the over-range capability of the structure 10. This means that the compressive stress to cause buckling should be greater than the tensile stress to cause fracture. To substantially resist buckling should have its first mode of failure in simple tension, not buckling from an equal or lesser compressive load. For a well supported silicon column, this requires that the lesser of width and thickness be more than, by way of example, 4% of the length The Euler equation for buckling of a fixed-end column is as follows:

$$\text{Critical force } P = \frac{4(pi^2)EA}{(l/r)^{\wedge}2}$$

$$\text{Critical Stress} = \text{force/area} = \frac{4(pi^2)E}{(l/r)^{\wedge}2}$$

By way of illustration, and without limitation, for a silicon column needing to carry 150,000 psi of compression, the length is no more than 43 times the lesser of width or thickness. In structures with columns at one surface, the columns do not have fully fixed ends and thus the permissible length is less.

The first gage link 20 can be made of a pre-tensioned material to resist buckling. The pre-tensioned material can be a heavily boron doped silicon material and the like. The pre-tensioned material is sufficiently doped to provide tensioning. The pre-tensioned material can be sufficiently doped to provide tensioning.

Substitution of an undersize atom into the silicon lattice leaves the doped crystal undersized, and it is dimensionally locked to the substrate. Boron is the best known example of an undersize atom to substitute as an active electrical dopant. The boron leaves the silicon strongly P-type.

In one embodiment, the electrochemical wafer 26 is initially in tension prior to forming the structure 10. By way of illustration, and without limitation, the electrochemical wafer 26 can be put in tension by being heavily doped with an undersized atom. The undersized atom can be boron and the like.

In one embodiment, the gage link is N-type 50 ohm-cm to 0.5 ohm-cm, and has embedded within it a P-type piezoresistor, extending beyond the link to have terminals on full-thickness material. The gage link is a P-type piezoresistor within an N-Type link except at a surface. At the surface, the gage link is covered with a protective layer during electrochemical etch to release the link from a P-type substrate. The gage link can have a thickness of 0.6 microns to 6 microns.

If the N-type link is very lightly doped, e.g., 10 ohm-cm, 5E14 phosphorus per cc, the P-type piezoresistor embedded in it might be as lightly doped as 1.5 ohm-cm, 1E16 boron per cc. If the piezoresistor were 1μ in depth, 4μ wide, and 18μ long, its resistance would be 67,000 ohms. The resistance commonly desired is about 5,000 ohms, suggesting a higher level of boron doping. The thickness of the structure can be about 125μ to 1000μ.

Figure 3A:
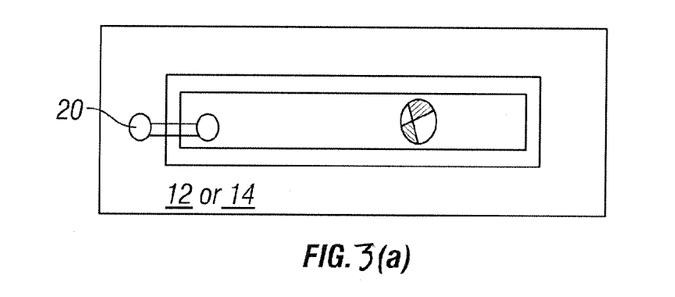
FIG. 3(a) illustrates an embodiment of a mechanical-to-electrical sensing structure of the present invention with the sensitivity going out of the plane of the structure.

In one embodiment, the structure 10 is an acceleration sensor. In this embodiment, one of the first or second movable blocks 12 or 14 is a frame and configured to sense acceleration, and the other first and second movable block 12 and 14 is a seismic mass of the acceleration sensor 10, FIGS. 3(a) and 3(b). In FIG. 3(a) there is sensitivity out of the plane of the structure 10, while in FIG. 3(b) there is sensitivity in the plane of structure 10. The first hinge 18 can extend into a thickness of the electrochemical wafer 26 to provide that permitted motion of the seismic mass is rotation within a plane of the electrochemical wafer 26.

Figure 3B:
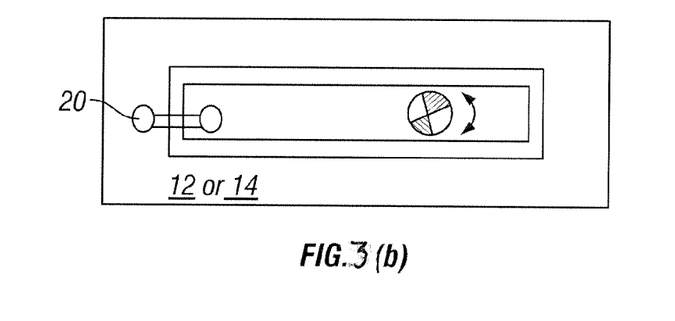
FIG. 3(b) illustrates an embodiment of a mechanical-to-electrical sensing structure of the present invention with the sensitivity in the plane of the structure.
Figure 3C:
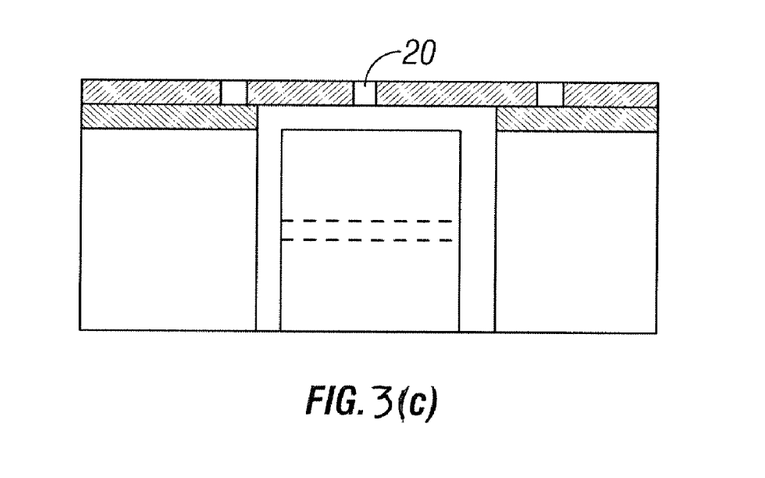

The frame, e.g., the first or second movable blocks 12 and 14, can extend around the seismic mass and is closely spaced to an end of the seismic mass in a direction away from the first hinge 18. This limits the motion of the seismic mass and minimizes excessive strain of the first gage link 20. The first hinge 18 can be parallel to a plane of the electrochemical wafer 26 to provide that permitted motion of the first hinge 18 is a rotation into and out a plane of the electrochemical wafer 26.

Figure 4:
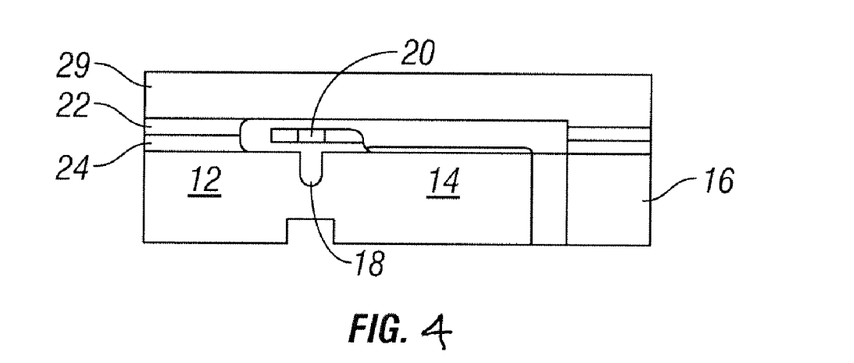
FIG. 4 illustrates another embodiment of a mechanical-to-electrical sensing structure of the present invention with a first additional layer of material parallel to and spaced away from the electrochemical wafer to limit motion of the seismic mass.
Figure 5:
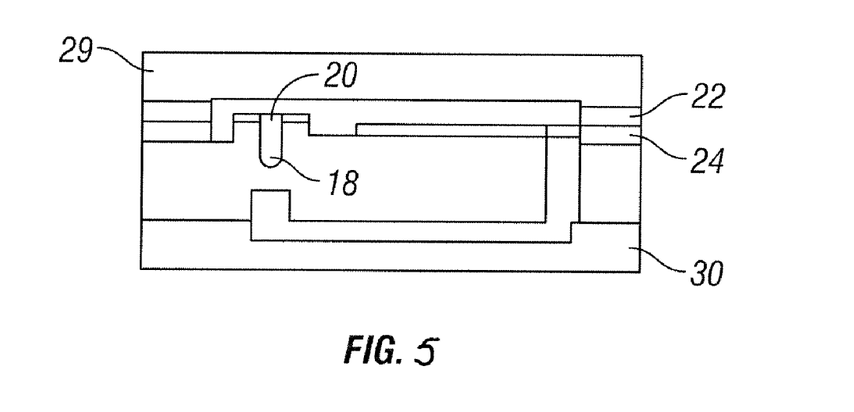
FIG. 5 illustrates another embodiment of a mechanical-to-electrical sensing structure of the present invention, similar to that of FIG. 3 but with a second additional layer.

As shown in FIG. 4, a first additional layer of material 29 is provided and is parallel to and spaced away from the electrochemical wafer 26 to limit motion of the seismic mass and minimize excessive strain of the first gage link 20. The first additional layer 29 provides a stop for the electrochemical wafer 26. Additional layers are above and below the layer with the accelerometer is there a more general term?, and closely spaced to the seismic mass to provide mechanical stops.

Additional layers above and below the layer with the accelerometer, closely spaced to the seismic mass to provide mechanical stops.

An example of a gage link structure sensor is disclosed in U.S. Pat. No. 4,498,229 incorporated herein by reference.

In another embodiment, the structure 10 is a pressure sensor. When the structure 10 is a pressure sensor, one of the relatively movable blocks 12 or 14 forms a continuous rim which may be sealed to a pressure source. One or more relatively movable blocks 12 or 14 lie within this. This thinned layer serves both as "hinge" locally where blocks are adjacent and as a pressure diaphragm for summing pressure into force.

In varying levels of complexity of pressure sensors, we consider rims within which are one interior block and one hinge with gage link, two interior blocks with three hinges among them and the rim, three interior blocks with four hinges, and five interior blocks with eight hinges, and the like.

With two interior blocks, each block is hinged to the rim and the interior ends of the blocks are hinged to each other, generally, between the sides of the blocks, and the rim is a broad expanse of the diaphragm for flexibility. Application of pressure forces the blocks to tilt relative to the rim. Assuming pressure is applied to the side of the structure opposite to the bearing gage links, a gage link between an interior block and the rim will be compressed. The hinge between the two interior blocks will see the sum of the tilts of the two blocks. If blocks are of equal length, the tilt at the central hinge will be twice that at either edge hinge. If the hinge and a gage link are the same length as an edge gage link, it will see twice the level of tension that the edge gage link sees of compression.

The difference of the stress levels can be minimized by making the interior blocks of very unequal length, so the longer block adds little to the tilt of the shorter block. If equality of stress levels is sought, the hinge and gage link between two equal blocks could be twice as long as the gage link and hinge at the edge.

Because electrical connection to interior gage links is difficult, the most easily employed structure is that with three interior blocks and four hinges among them and the rim. If the blocks adjacent to the rim are of equal length, gage links across the four hinges can show equal and opposite strains in response to pressure, which is desirable for linearity in a Wheatstone bridge. Further, the central block can have its motion plane-parallel to the frame. Plane parallel motion permits electrical connection from the central block to the rim via freed links of the same material as the gage links, as described in U.S. Pat. No. 4,737,473 incorporated herein by reference.

Figure 6:
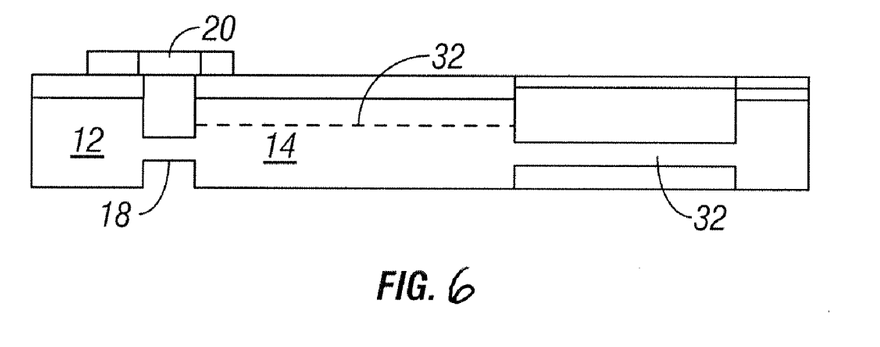
FIG. 6 illustrates one embodiment of the present invention with a rim block of a pressure sensor.

As illustrated in FIG. 6, one of the first or second movable blocks 12 or 14 is a rim block of the pressure sensor 10, and the other movable block 12 or 14 is an inward-extending block that extends in an inward direction away from the rim block 12 or 14. The first hinge 18 is a portion of a diaphragm 32 occupying an area between the rim block 12 or 14 and the inward-extending block 12 or 14.

Figure 7A:
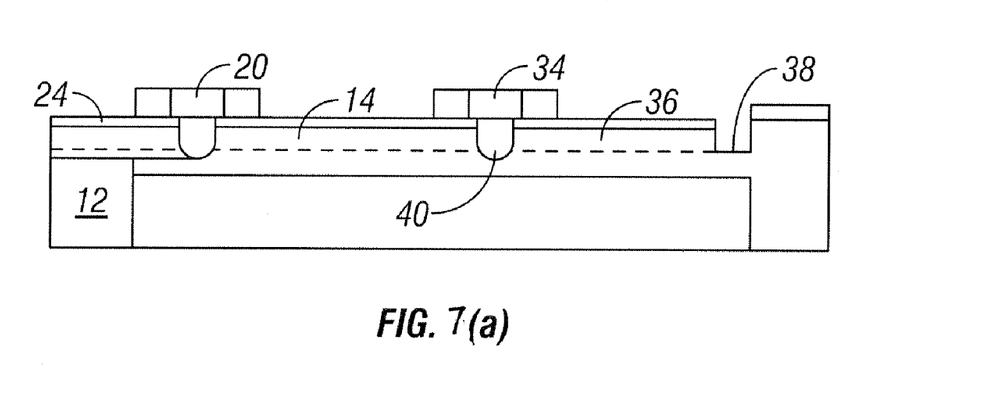
FIG. 7(a) is a sectional view illustrating an embodiment of the present invention with a second gage link, a third movable block and a third hinge.
Figure 7B:
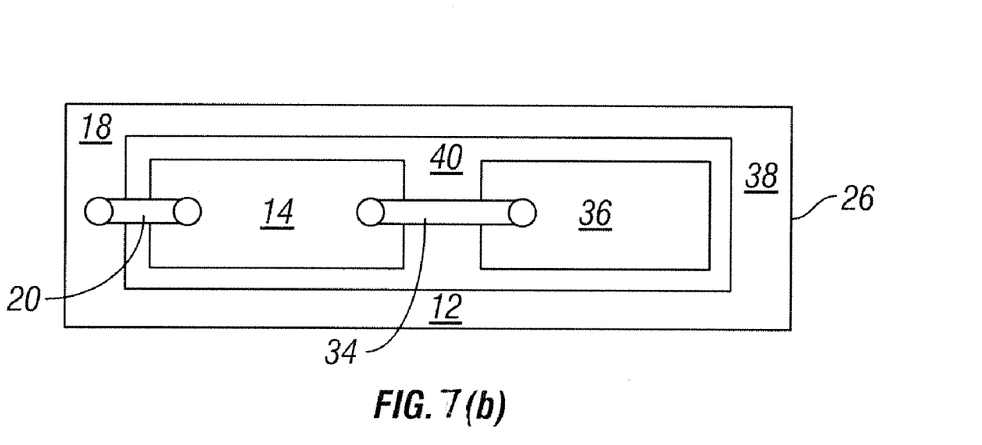
FIG. 7(b) is a top down view of the FIG. 7(a) structure.

In another embodiment, the structure 10 has a second gage link 34, illustrated in FIGS. 7(a) and 7(b), a third movable block 36 and a second hinge 38 are provided. In this embodiment, the first movable block 12 is a rim block around the pressure sensor 10, the second and third movable blocks 14 and 36 extend inward from the rim block 12 in a direction toward each other to define a third hinge 40 between the second and third movable blocks 14 and 36. The second and third hinges 38 and 40 are portions of the diaphragm 32 that is continuous within the rim block 12 to provide that the first gage link 20, disposed between the rim block 12 and the second block 14, sees compression at substantially a same time that the second gage link 34, between the second block 14 and the third block 36, sees tension.

The rim block 12, second and third movable blocks 14 and 36 can all be aligned in a row from one side of the rim block 12 to the other. The lengths of the blocks 14 and 36 that are adjacent to the rim block 12 can be about equal. The equal lengths provide that under applied pressure the central block moves plane-parallel to the rim block 12. Blocks 14 and 36 adjacent to the rim block 12 tilt equally, and an angular deflection of the second and third hinges 38 and 40 are about equal and opposite to each other.

In this embodiment, the first and second gage links 20 and 34 can have substantially equal and opposite stresses. The second and third hinges 38 and 40 can be substantially linear portions of the diaphragm 32 that is continuous within the rim block 12. The first and second gage links 20 and 34 can be positioned at different sides of the hinge. One of the first or second gage links 20 or 34 can be in tension while the other gage link 20 or 34 is in compression.

In this embodiment, at least first, second and third hinges 18, 38 and 40 are coupled to the first, second and third movable blocks 12, 14 and 36. The first, second and third hinges 18, 38 and 40 resist loads other than flexing of the first and second hinges 38 and 40. The third hinge 40 hinges the first and third blocks 12 and 14.

At least first and second gage links 20 and 34 are separated from the first, second and third hinges 18, 38 and 40. The first and second gage links 20 and 34 are aligned in a manner to provide that a moment tending to rotate one of the first, second or third blocks 12, 14 and 36, relative to the other one about the first and second hinges 18 and 38, applies a tensile or compressive force along a length of the first and second gage links 20 and 34.

At least one of the first or second gage links 20 or 34 is in tension, and the other gage link 20 or 34 is in compression. The gages are P-type material embedded in N-type links, defended from etching by electrochemical bias.

Figure 8A:
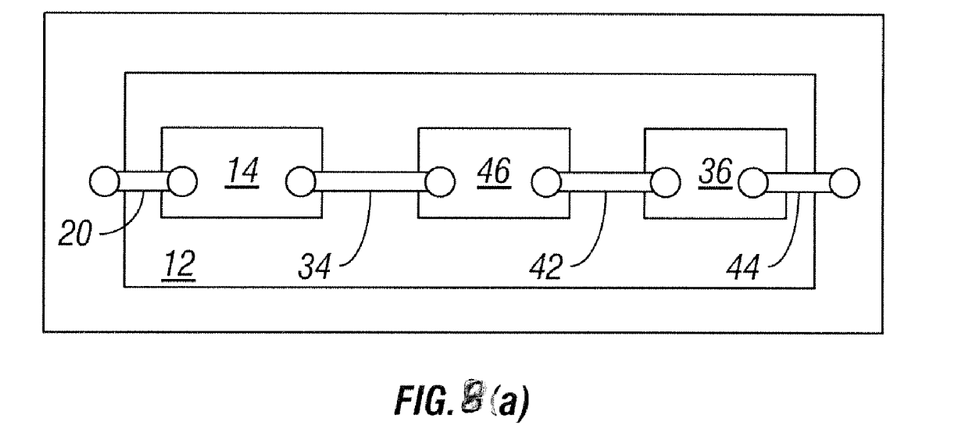
FIG. 8(a) is a sectional view illustrating another embodiment of a mechanical-to-electrical sensing structure of the present invention with a third block and a fourth hinge.
Figure 8B:
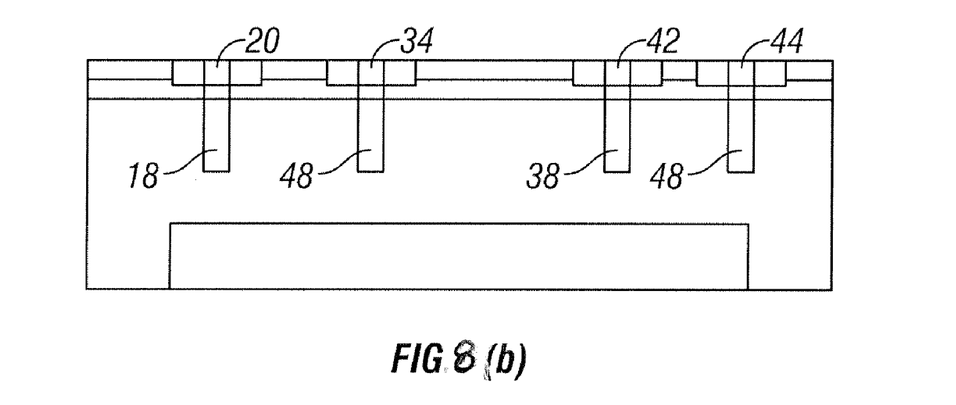
FIG. 8(b) is a top down view of the FIG. 8(a) structure.

As illustrated in FIGS. 8(a) and 8(b), a third block 46 and a fourth hinge 48 can be provided. In this embodiment, the mechanical-to-electrical sensing structure 10 is again made from the electrochemical wafer 26

In one embodiment, the first block 12 is a rim block and the second and third blocks 14 and 36 are tilting blocks. Third and fourth gage links 42 and 44 can be provided. In one embodiment, the strains in all of the gage links 20, 34, 42 and 44 are equal and opposite.

Figure 9:
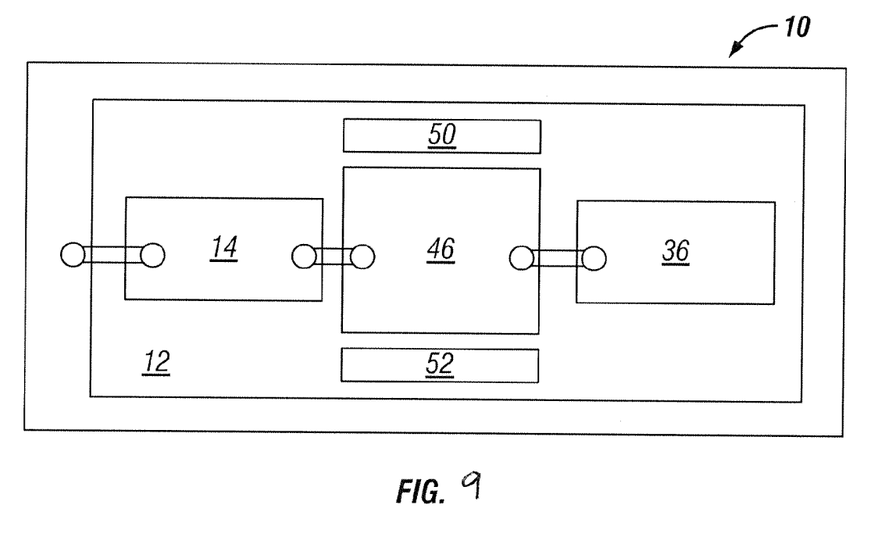
FIG. 9 illustrates another embodiment of a mechanical-to-electrical sensing structure of the present invention with six blocks.
Figure 10:
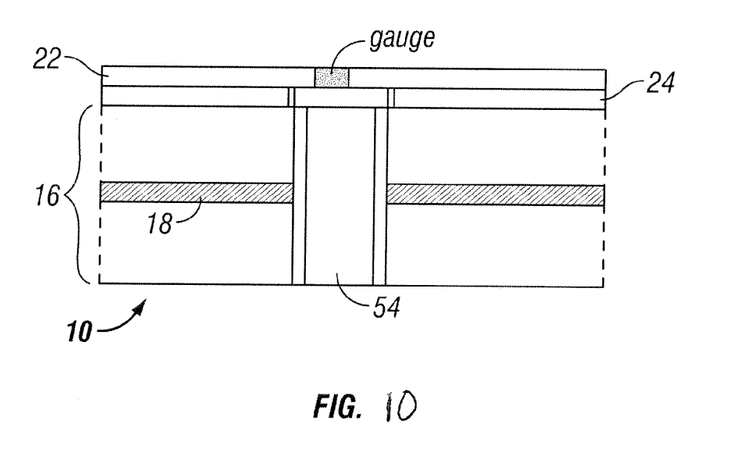
FIG. 10 illustrates another embodiment of a mechanical-to-electrical sensing structure of the present invention with an opening formed below the gage link.

Referring to FIG. 9, the mechanical-to-electrical sensing structure 10 can include fourth, fifth and sixth blocks 46, 50 and 52. In this embodiment, the first block 12 is a rim block. The other five blocks are as follows: one of the blocks is a central block, two of the blocks are tilting measuring blocks, and two of the blocks are tilting non-linearity blocks.

A pattern is outlined on the electrochemical wafer 26. Hinges are formed. In various embodiments, the hinges can extend vertically into the electrochemical wafer 26, substantially horizontal relative to the electrochemical wafer, and the like. The process description needs converting to electrochemistry. This may take multiple descriptions: Diffusion to define the areas to be defended from the etch by bias, or cutting of the pattern from a continuous sheet of N-type material, whether that material has been produced by diffusion into a P-type wafer or has been supplied as an epitaxial layer grown upon a p-type wafer.

Oxide and etch-resistant oxide or nitride is removed from the exterior surfaces of the first piezoresisive element with substantially only the first gage link carrying the tensile or compressive force. Material is removed under the structure using wet chemistry in addition to a deep reactive ion etch dry chemistry and electrical bias is utilized to defend the n-type material from attack by the wet etchant.

In another embodiment, two substrate wafers are used. One of the wafers incorporates gage links and the other includes the grooves which the links are to span. In one specific embodiment, the wafer with the gage links that are not fully defined has an N-type layer of appropriate thickness from which links may be etched. After bonding, the bulk of this wafer is etched away, electrochemically stopping at the N-type layer. This continuous layer does not need precise alignment for bonding. After bonding the wafers, and revealing the N-type layer, the gage links can be precisely aligned with the grooves in the mating wafer. This is achieved by first diffusing or implanting their P-type conductors, followed by etching their outlines in the thin residual layer.

In another embodiment, wafer-to-wafer bonding includes a sufficient thickness of an oxide, by way of illustration and without limitation 0.1 micron, to provide good electrical isolation between wafers. When the N-type layer is revealed the wafer closely resembles an SOI material based system. The N-type layer must be re-doped to the desired P-type doping levels. The deep grooves under the gage links are already in place. This fabrication pathway restores the electrical benefits.

The foregoing description of embodiments of the present invention has been presented for purposes of illustration and description. It is not intended to be exhaustive or to limit the invention to the precise forms disclosed. Obviously, many modifications and variations will be apparent to practitioners skilled in this art. It is intended that the scope of the invention be defined by the following claims and their equivalents.

The invention claimed is:

1. A mechanical-to-electrical sensing structure, comprising:
   first and second and third movable blocks;
   a first hinge coupled to the first and second movable blocks and configured to resist loads other than flexing of the first hinge;

at least a first gage link separated from the first hinge and aligned to provide that a moment tending to rotate one of the first or second blocks relative to the other about the first hinge applies a tensile or compressive force along a length of the first gage link, wherein electrochemistry is used to define the at least first gage; and a second gage link, wherein the first movable block is a rim block around the sensing structure, the second and third movable blocks extend inward from the rim block in a direction toward each other to define a second hinge between the second and third movable blocks, the second hinge being portion of a diaphragm that is continuous within the rim block to provide that the first gage link disposed between the rim block and the second block sees compression at substantially a same time that the second gage link between the second block and the third block sees tension.

2. The structure of claim 1, wherein the structure is made of silicon oriented (110) with the at least first gage link aligned in a [111] direction.

3. The structure of claim 1, wherein the at least first gage link has embedded within it a P-type piezoresistor.

4. The structure of claim 3, at a surface the at least first gage link is covered with a protective layer during electrochemical etch to release the at least first gage link from the P-type piezoresistor.

5. The structure of claim 3, wherein the P-type piezoresistor extends beyond the gage link.

6. The structure of claim 5, wherein dimensions of the at least first gage link are enlarged to allow for errors in alignment and dimensional control.

7. The structure of claim 6, wherein the dimensions of the at least first gage link are a minimum of about 1E-4 cm in thickness, 6E-4 cm in width and 14E-4 cm in length.

8. The structure of claim 7, wherein the at least first gage link has a strained volume of about 8.4E-11 cubic cm.

9. The structure of claim 5, wherein a resistance of the at least first gage link is controlled by p-type doping.

10. The structure of claim 9, wherein the p-type doping is about 1000 to 3000 ohms.

11. The structure of claim 3, wherein the at least first gage link is embedded in a mechanical link of N-type material.

12. The structure claim 11, wherein the first gage link within the N-Type link is the P-type piezoresistor except a portion of a surface.

13. The structure of claim 11, wherein the N-type material has a 50 ohm-cm to about 0.5 ohm-cm range.

14. The structure of claim 1, wherein a thickness of the at least first gage link is from 0.6 microns to 6 microns.

15. The structure of claim 1, wherein a thickness of the entire structure is from about 125 microns to 1000 microns.

16. The structure of claim 1, wherein the first gage link is proportioned to substantially resist buckling in compression.

17. The structure of claim 1, wherein the structure is an acceleration sensor.

18. The structure of claim 17, wherein the first movable block is configured to sense acceleration and one of the second or third movable blocks is a seismic mass of the acceleration sensor.

19. The structure of claim 18, wherein one of the first or second gage links is in tension the other gage link is in compression.

20. The structure of claim 19, wherein the first hinge extends into a thickness of an electrochemical wafer to provide that permitted motion of the seismic mass is rotation within a plane of the electrochemical wafer.

21. The structure of claim 20, wherein the frame extends around the seismic mass and is closely spaced to an end of the seismic mass in a direction away from the first hinge to limit the motion of the seismic mass and minimize excessive strain of the first gage link.

22. The structure of claim 20, wherein the first hinge is parallel to a plane of the electrochemical wafer to provide that permitted motion of the first hinge is a rotation into and out a plane of the electrochemical wafer.

23. The structure of claim 22, further comprising:
a first additional layer of material parallel to and spaced away from the electrochemical wafer to limit motion of the seismic mass and minimize excessive strain of the first gage link.

24. The structure of claim 23, wherein the first additional layer provides a stop for the electrochemical wafer.

25. The structure of claim 1, wherein the structure is a pressure sensor.

26. The structure of claim 1, wherein the rim block the second and third movable blocks are aligned in a row from one side of the rim block to the other.

27. The structure of claim 26, further comprising:
a fourth movable block, wherein lengths of the blocks adjacent to the rim block are about equal to provide that under applied pressure one of the movable blocks moves plane-parallel to the rim block, the two blocks adjacent to the rim block tilt equally, and an angular deflection of the second and third hinges are about equal and opposite.

28. The structure of claim 27, wherein the first and second gage links have substantially equal and opposite stresses.

29. The structure of claim 28, wherein the second and third hinges are substantially linear portions of the diaphragm that is continuous within the rim block.

* * * * *